United States Patent [19]

Cooley et al.

[11] 4,426,579

[45] Jan. 17, 1984

[54] LINEARIZATION OF SAMPLED GEIGER-MUELLER RADIATION DETECTOR

[75] Inventors: Harold J. Cooley, Spring Valley, N.Y.; Elmo J. DiIanni, Mountain Lakes, N.J.

[73] Assignee: The United States of America as represented by the Secretary of the Army, Washington, D.C.

[21] Appl. No.: 330,427

[22] Filed: Dec. 14, 1981

[51] Int. Cl.$^3$ .............................................. G01T 1/18
[52] U.S. Cl. ..................................... 250/374; 250/388
[58] Field of Search ............... 250/336, 374, 375, 388

[56] References Cited

U.S. PATENT DOCUMENTS

| | | | |
|---|---|---|---|
| 3,407,299 | 10/1968 | Jehle | 250/375 |
| 4,090,082 | 5/1978 | Marshall et al. | 250/375 |
| 4,311,909 | 1/1982 | Utting et al. | 250/374 |

Primary Examiner—Janice A. Howell
Attorney, Agent, or Firm—Robert P. Gibson; Jeremiah G. Murray; Edward Goldberg

[57] ABSTRACT

In a sampled radiation detector including a pulsed Geiger-Mueller detector tube the response to gamma radiation is linearized by providing an additional "reward" pulse after the second of two adjacent pulses of a pulse train generated from Geiger-Mueller pulses outputted from the detector tube during at least two consecutive sampling time periods and wherein the pulse train is thereafter time averaged to provide a measurement signal which is a linear function of the radiation field strength.

13 Claims, 4 Drawing Figures

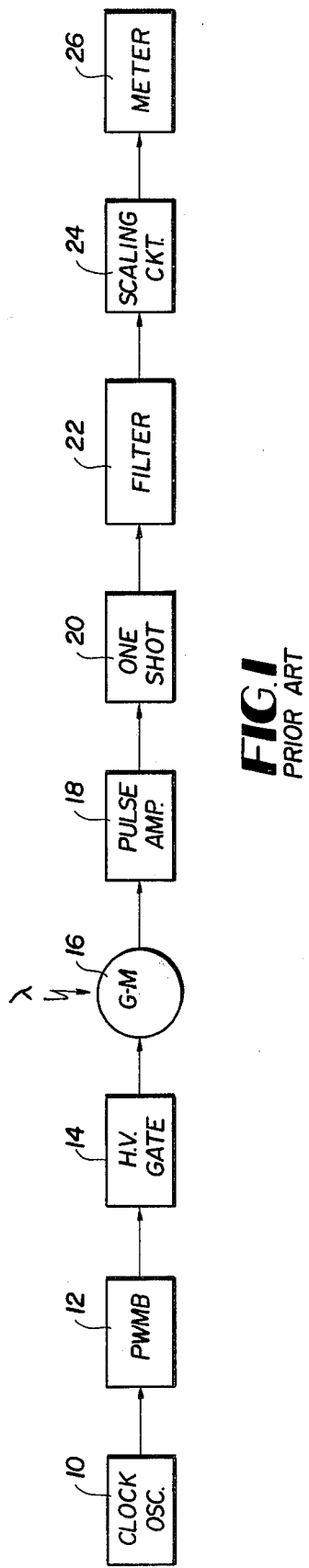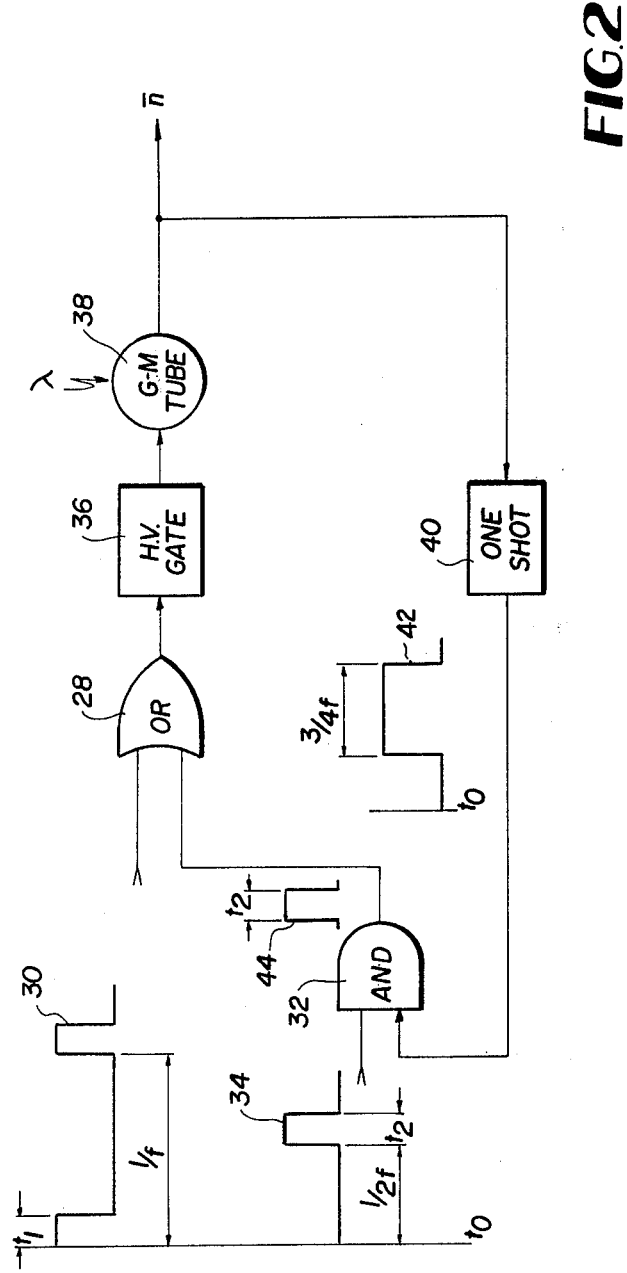

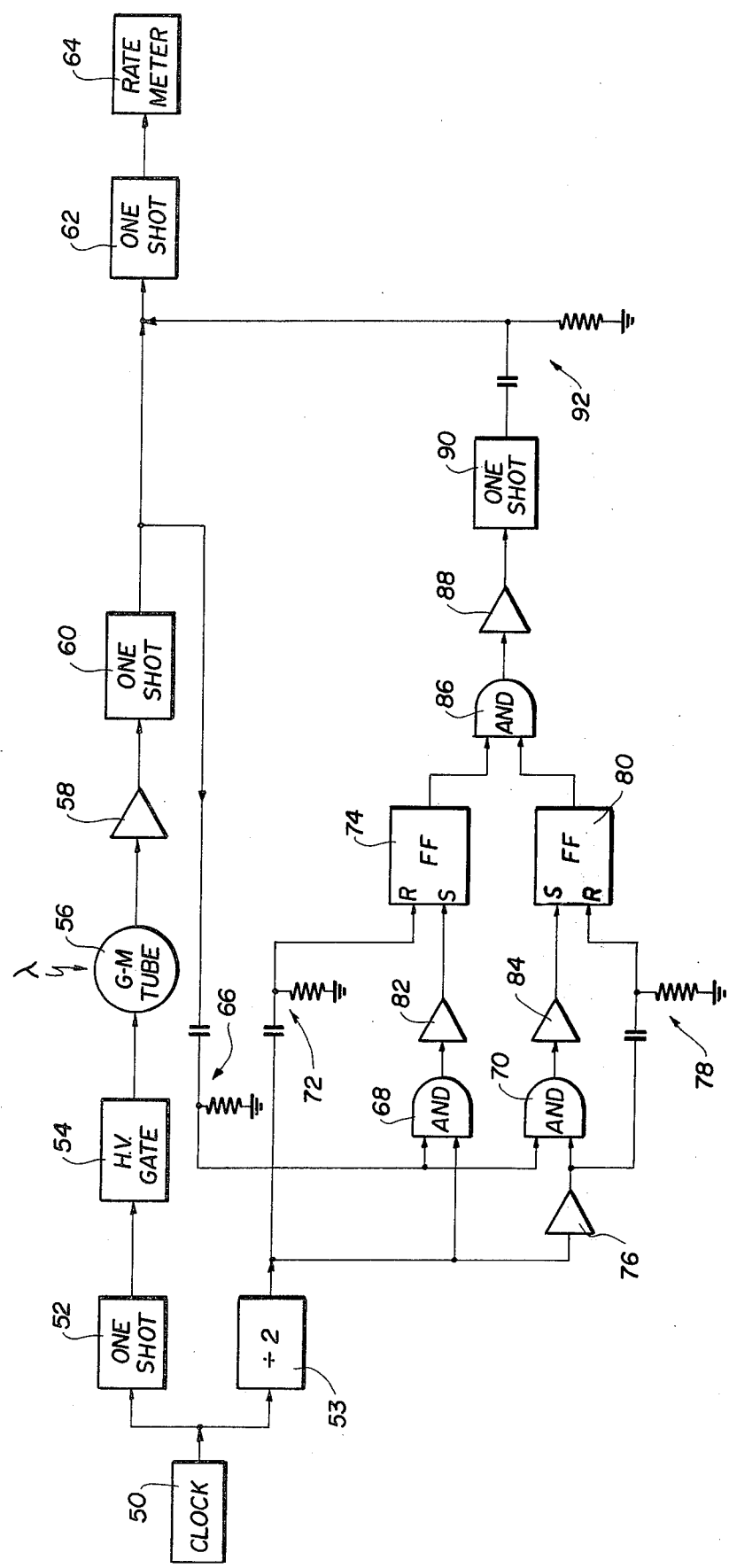

LINEARIZATION OF SAMPLED GEIGER-MUELLER RADIATION DETECTOR

The government has rights to this invention pursuant to Contract No. DAAB07-76-C-0075 awarded by the Department of the Army.

BACKGROUND OF THE INVENTION

This invention relates generally to radiation detectors and more particularly to pulsed Geiger-Mueller radiation detectors.

In pulsed radiation detectors having one or more Geiger-Mueller (G-M) tubes, the tube is repetitively driven into its operating region for a predetermined sampling time at a fixed repetition rate. During the time during which the tube is rendered operative, the release of an electron derived from a gamma photon, for example, impinging upon the cathode inside the tube will produce a single G-M pulse. The G-M pulses are used to generate a random pulse train having an average repetition rate which provides a measure of the radiation intensity. Under this mode of operation, the detector response of known prior art apparatus follows the law of probability, i.e. $P=1-e^{-\lambda T}$ where $\lambda T$ is the number of photons detected in a given sampling period. Such a response is non-linear, however, due to the exponential term. It is to this non-linearity that the present invention is directed.

Accordingly, it is an object of the present invention to provide an improvement in radiation detectors.

It is yet another object of the present invention to provide an improvement in Geiger-Mueller radiation detectors.

Still a further object of the present invention is to provide an improvement in pulsed Geiger-Mueller radiation detectors.

SUMMARY

Briefly, the foregoing and other objects of the present invention are provided by a method and apparatus for linearizing the detection response of a Geiger-Mueller (G-M) radiation detector wherein at least one G-M tube is periodically driven into its operating region for a predetermined sampling period at a fixed repetition rate and wherein the impingement of radiation particles, such as gamma ray photons, on the G-M tube produce Geiger-Mueller pulses only during sampling periods. The response is linearized by providing an additional "reward" pulse after the second of two adjacent pulses generated from the Geiger-Mueller pulses outputted from the tube during two consecutive sampling periods. A pulse train of uniform amplitude and pulse width is generated from the pulses which are time averaged to provide a signal which is substantially linearly proportional to the radiation intensity.

BRIEF DESCRIPTION OF THE DRAWINGS

FIG. 1 is an electrical block diagram illustrative of a typical prior art pulsed Geiger-Mueller radiation detector;

FIG. 2 is an electrical block diagram illustrative of a feedback circuit configuration in accordance with the subject invention;

FIG. 3 is an electrical block diagram of the preferred embodiment of the subject invention.

DESCRIPTION OF THE PREFERRED EMBODIMENT

Figure 4:
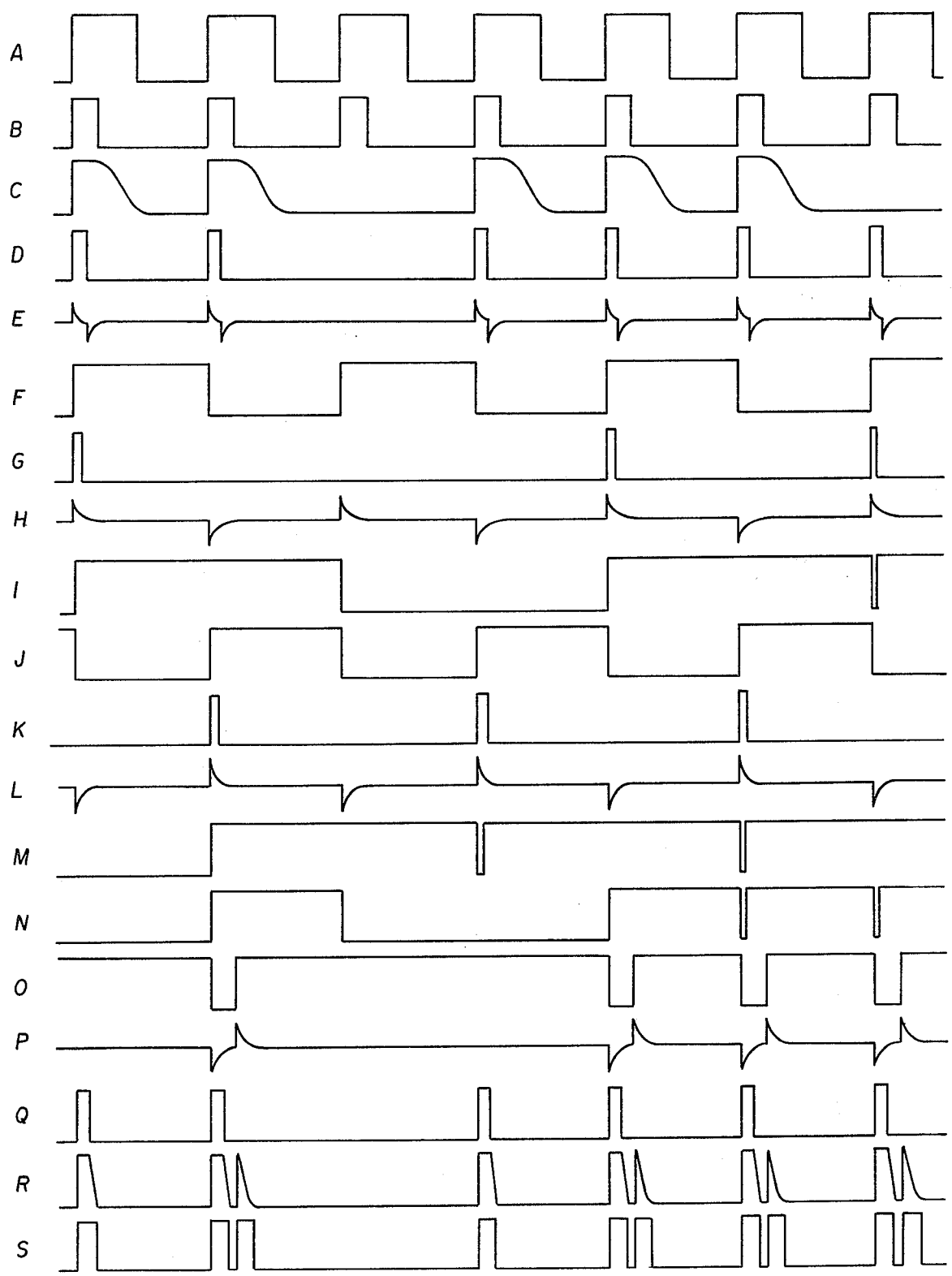
FIG. 4 is a set of time related waveforms helpful in understanding the operation of the embodiment shown in FIG. 3.

Referring now to the drawings and more particularly to FIG. 1, there is disclosed a typical example of a prior art pulsed Geiger-Mueller (G-M) radiation detector. As shown, a clock pulse oscillator 10 having a fixed pulse repetition rate is coupled to a pulse width multivibrator 12, typically a one shot multivibrator, which is triggered thereby to provide a square wave output which is adapted to operate a high voltage gate 14 for a predetermined time period (t) which corresponds to a sampling period for a G-M tube 16. The gate pulse applied from the gate circuit 14 to the G-M tube 16 is adapted to drive the tube into its operating region for a sampling time t. Accordingly, the tube 16 will produe a single G-M pulse upon the occurrence of a radiation particle (gamma ray photon) impinging on the tube whereupon an electron will be released. The probability P (a number between 0 and 1) of obtaining a G-M pulse during the sampling period t can be expressed by equation:

$$P=1-e^{-nrt} \quad (1)$$

where n is the G-M tube sensitivity in counts/seconds/milliroentgens/hour, r is the gamma radiation field in the milliroentgens/hour and t as noted is the observation of sampling duration time expressed in seconds.

Accordingly, the coincidence between the application of the gate pulse and a photon on the G-M tube 16 causes a G-M pulse to be produced which is coupled to a pulse amplifier 18 which triggers a one shot pulse generator circuit 20. The one shot circuit 20 in turn generates a random pulse train of pulses having a fixed amplitude and pulse width whose average repetition rate is substantially proportional to radiation intensity. The pulse train outputted from the one shot circuit 20 is time averaged in an RC filter 22 which provides a voltage proportional to the radiation intensity. The voltage output from the filter circuit 22 is fed to a meter scaling circuit 24 and then applied to a meter 26 suitably calibrated for displaying the magnitude of radiation intensity.

The specific details of the various circuits can take many different configurations; however, what is significant about pulsed operation of prior art Geiger-Mueller radiation detectors is that the detection response follows the law of probability according to equation (1). Since the equation includes an exponential the response characteristic is non-linear.

Turning attention now to the subject invention, if a probability term $P^2$ were added to the initial term P, a series expansion in the form of $P+P^2$, a linear function, would result. Accordingly, if the receipt of a G-M pulse were used to provide an additional sampling period, a probability term of $P^2$ is provided which if added to the original probability term of P, the response of the detector and subsequent readout woul be linearized.

One method of implementing the $P^2$ probability term is shown in FIG. 2 and involves using a G-M pulse to trigger an additional sampling period $t_2$ following a sampling period $t_1$. As shown, the circuitry of FIG. 2 includes an OR gate 28 having one input coupled to the gate pulse train 30 having a frequency of f and a pulse width of $t_1$. The other input to the OR gate 28 is a feedback signal comprising the output of an AND gate 32 which has one of its inputs consisting of a pulse train 34 having a frequency of 2f and a pulse width of $t_2$. As shown, $t_2$ is substantially equal to $t_1$. The output of the OR gate 28 is fed to a high voltage gate 36 which is coupled to the G-M tube 38 which outputs an average pulse rate n. The output of the G-M tube 38 is also coupled to a one shot circuit 40 which outputs a pulse 42 having a pulse width of $t_3$ which is equal to $\frac{3}{4}f$. The pulse 42 is applied to the other input of the AND gate 32. Accordingly, upon the coincidence of the $t_2$ pulse 34 and the $t_3$ pulse 42, the AND gate will output a feedback pulse 44 having a pulse width of $t_2$ which when applied to the OR gate 28, causes the high voltage gate 36 to again reenergize the G-M tube 38 for another sampling period. In such an instance, the average pulse rate $\bar{n}$ is expressed as $\bar{n}=fP^2$ whereas without the feedback, the average pulse rate is $\bar{n}=fP$.

Referring now to FIG. 3, there is shown an embodiment for implementing an $\bar{n}=f(P+P^2)$ average pulse rate by generating an extra "reward" or "bonus" pulse in the event that G-M pulses are generated by the G-M tube during at least two consecutive sampling time periods. The purpose of the extra pulse is that the additional "reward" or "bonus" pulse acts to linearize the detection response. Considering FIG. 3 along with the time related waveforms shown in FIG. 4, the clock oscillator 50 simultaneously applies the clock pulses of a predetermined fixed pulse repetition frequency to a one shot circuit 52 and a ÷2 counter circuit 53. The output of the clock 50 corresponds to waveform A of FIG. 4, while waveform B corresponds to the output of the one shot circuit 52. Waveform B also reflects the high voltage applied to the G-M tube 56 from a high voltage gate 54. The output of the G-M tube 56 in response to a radiation particle (gamma photon) being detected is coupled to a pulse amplifier 58 whose output is shown corresponding to waveform C of FIG. 4. Waveform C is applied to a second one shot circuit 60 which generates a relatively narrow pulse width output as shown by waveform D. This voltage waveform D is applied to a third one shot circuit 62 which generates the first pulse of a pulse train of pulses having uniform amplitude and pulse width, typically 50 μs (waveform S) which waveform is also applied to the meter circuit 64. The output (waveform D) from the one shot circuit 60 is also differentiated in an RC differentiator circuit 66 as evidenced by waveform E and is commonly applied to one input of a pair of AND binary logic gates 68 and 70. Meanwhile, the output of the counter circuit 53, which is at half the frequency of the clock 50 and which is shown by waveform F of FIG. 4, is applied to the other input of AND gate 68 and to a second differentiator circuit 72 which is coupled to the reset (R) input of a well known binary flip-flop circuit 74. The output of the ÷2 counter circuit 53 is additionally fed to an inverter circuit 76 whose output is coupled to the other input of AND gate 70 and to a third differentiator circuit 78 which is coupled to the reset (R) input of the flip-flop 80. Both the AND gates 68 and 70 are respectively coupled to logic inverter circuits 82 and 84 which have their respective outputs coupled to the set (S) inputs of the flip-flops 74 and 80.

In operation, a G-M pulse produced during the first sampling period (on time) of the G-M tube 56 will enable AND gate 68 whose output is inverted and applied as waveform G to the S input of flip-flop 74 so as to trigger the output of flip-flop 74 to its binary "high" state which will remain for two sampling periods (waveform I) before being reset by the positive spike (waveform H) of the voltage appearing across the resistor of the differentiator circuit 72. A G-M pulse outputted from the one shot circuit 60 during the next consecutive or second sampling period is shown by waveform K acts to enable the AND gate 70 coincidentally with the output of the inverter circuit 76 which is shown by waveform J. Enabling AND gate 70 applies a pulse to the set (S) input of flip-flop 80 which will "flip" to its "high" output state as evidenced by waveform M. The "high" outputs of the flip-flops 74 and 80 are simultaneously coupled to a third AND gate 86 which is enabled thereby to provide an output corresponding to waveform N. This output is inverted in an inverter circuit 88 where it is applied to a fourth one shot circuit 90 which provides a narrowed and inverted output corresponding to waveform O. The output of the one shot circuit 90 is applied to a fourth differentiator circuit 92 which provides a voltage waveform corresponding to waveform P whose positive going leading edge is delayed relative to the leading edge of waveform K, the second G-M pulse. Waveform Q corresponds to the pulse signal applied to the one shot circuit 62 from the one shot circuit 60. The differentiated voltage waveform is applied as shown by waveform R to the one shot 62 which provides another pulse after the second output pulse of the waveform S, the signal applied to the meter circuit 64. Accordingly, when the delayed trigger from the differentiator circuit 92 is applied to the one shot circuit 62, a "reward" pulse is generated and added to the pulse train typically 80 μs following the beginning of the second pulse, to linearize the response of meter circuit 64.

It can also be seen by reference to the waveforms of FIG. 4 that at the end of the second sampling time period, the flip-flop 74 will be reset to its "low" output state as evidenced by waveform I. If during the third sampling time no G-M pulse is produced by the G-M tube 56, the one shot circuit 90 will not be triggered and will remain in its "low" output state and no additional "reward" pulse will be generated. Thus G-M pulses in two consecutive sampling periods are required before a "reward" pulse is produced and will continue to be produced if G-M pulses are produced in consecutive sampling periods thereafter as shown by waveform S.

While the circuit in FIG. 3 does not retrigger the high voltage gate as shown in FIG. 2 to provide an additional sampling time, the circuit in FIG. 3 does retrigger the one shot circuit 62 which operates to add sufficient current, by means of the "reward" pulse to the rate meter circuit 64, to linearize the probability function and thus the response of a time averaging filter circuit included in the metering circuit. When desirable, however, the differentiated voltage waveform P appearing at the differentiator circuit 92 can be coupled back to the high voltage gate 54 to produce another sampling time as taught in FIG. 2.

In actual practice the one shot circuits 52 and 60 of FIG. 3 are implemented by means of a first (MM 54C 221J) dual monostable multivibrator fabricated as an integrated circuit module while the other two one shot circuits 62 and 90 are implemented by means of a second (MM 54 C221J) dual monostable multivibrator. The logic gates, inverters and flip-flops shown in FIG. 3, moreover, are configured from (CD 4011 AF) integrated circuit logic modules while the ÷2 counter 53 is provided from (CD 4013 AF) integrated circuit module and the clock oscillator 50 is configured from a (CD 4000 AF) integrated circuit module.

Accordingly, what has been shown and described is a technique for linearizing the detection response of a pulsed Geiger-Mueller radiation detector. While the subject invention has been described with a certain degree of particularity, the foregoing has been made by way of illustration and not limitation. Accordingly, all modifications, alterations and changes coming within the spirit and scope of the invention as set forth in the appended claims are herein meant to be included.

What is claimed is:

1. Apparatus for detecting particles of radiation including gamma ray photons, comprising in combination:
   Geiger-Mueller detector means;
   means for operating said detector means in a pulsed mode of operation for predetermined first sampling time periods occurring at a predetermined repetition rate and for generating Geiger-Mueller pulses for particles of radiation being detected during any of said sampling time periods, the probability of the occurrence of a Geiger-Mueller pulse during said sampling time having a non-linear response characteristic;
   means for converting the Geiger-Mueller pulses generated into electrical pulse signals of a generally uniform amplitude and pulse width providing a random pulse train having an average repetition rate substantially proportional to the radiation intensity of said particles of radiation;
   means for generating additional electrical pulse signals in response to said Geiger-Mueller pulses occurring at different time periods following said first periods and of the same generally uniform amplitude and pulse width, said additional electrical signals being added to said pulse train and causing the average repetition rate of said pulse train to be substantially linearly proportional to said radiation intensity; and
   means for measuring the average repetition rate of said random pulse train and providing an indication thereof.

2. The apparatus as defined by claim 1 wherein said means for generating additional electrical pulse signals generates an added pulse occurring upon the generation of Geiger-Mueller pulses during two consecutive sampling time periods and wherein said means for operating said detector means in a pulsed mode of operation includes means for generating a clock signal having a substantially constant repetition rate; and first pulse signal generator means responsive to said clock signal and being triggered thereby to generate pulse signals of a predetermined pulse width for driving said detector means into an operative state for respective predetermined sampling periods.

3. The apparatus as defined by claim 2 including filter means providing a signal indicative of the average pulse repetition rate.

4. The apparatus as defined by claim 2 wherein said means for generating additional electrical signals includes means for repulsing the Geiger-Mueller detector following an electrical pulse signal being generated for a radiation particle being detected during the latter of said two consecutive sampling time periods.

5. The apparatus as defined by claim 2 wherein said first pulse signal generator means comprises a first one shot pulse generator.

6. The apparatus as defined by claim 5 wherein said converting means comprises second pulse signal generator means triggered by said Geiger-Mueller pulses.

7. The apparatus as defined by claim 6 wherein said second pulse signal generator means comprises a second one shot pulse generator.

8. Apparatus as defined by claim 6
   wherein said second pulse generator means triggered by said Geiger-Mueller pulses produces respective intermediate output pulses and including a third pulse generator driven by said intermediate output pulses for providing output pulses of generally uniform amplitude and pulse width, and
   wherein said means for generating an additional electrical signal includes a fourth pulse generator and logic circuit means coupled to said clock oscillator and said second pulse generator, said logic circuit means being operable to trigger said fourth pulse generator in response to intermediate output pulses being produced in at least two consecutive sampling time periods, said fourth pulse generator generating another intermediate output pulse, said another intermediate output pulse being coupled to said third pulse generator for generating another output pulse delayed in time with respect to the output pulse occurring in the latter of said at least two consecutive sampling time periods.

9. The apparatus as defined by claim 8 wherein said first, second, third and fourth pulse generators are comprised of one shot pulse generators.

10. The apparatus as defined by claim 8 wherein said first, second, third and fourth pulse generators are comprised of monostable multivibrators.

11. The apparatus as defined by claim 8 wherein said logic circuit means comprises binary logic circuit means.

12. The apparatus of claim 1 wherein said means for generating additional pulse signals includes feedback means generating pulses at a higher repetition rate than and at sampling periods following said first periods.

13. The apparatus of claim 12 wherein said feedback means includes a one shot circuit connected to the output of said Geiger-Mueller detector means, an AND circuit having one input connected to the output of said one shot circuit, an OR circuit having one input connected to the output of said AND circuit, a high voltage gate connected to the output of said OR circuit and to the input of said Geiger-Mueller detector means, said means for operating said detector in a pulsed mode being connected to the other input of said OR circuit, and pulse means operating at twice the repetition rate of said first time periods connected to the other input of said AND circuit.

* * * * *